G. A. BREWER.
ROLLER BEARING.
APPLICATION FILED APR. 18, 1908.

954,922.

Patented Apr. 12, 1910.

Witnesses:

Inventor
Grace A. Brewer
By her Attorney

UNITED STATES PATENT OFFICE.

GRACE A. BREWER, OF BAYONNE, NEW JERSEY, ASSIGNOR TO CIRCUM BEARING COMPANY, OF TRENTON, NEW JERSEY.

ROLLER-BEARING.

954,922.  Specification of Letters Patent.  Patented Apr. 12, 1910.

Application filed April 18, 1908. Serial No. 427,812.

*To all whom it may concern:*

Be it known that I, GRACE A. BREWER, citizen of the United States, and resident of Bayonne, in the county of Hudson and State of New Jersey, have invented certain new and useful Improvements in Roller-Bearings, of which the following is a specification.

The invention relates to improvements in roller-bearings, especially adapted for wheels applied to the fixed axles of trucks and the like and upon which they may revolve with a minimum amount of frictional resistance. Its application may likewise extend to the support of rotating shafts and embraces a wide range of use.

The object of the invention includes a form of wheel-body or roller-casing for containing the antifriction rollers and axle which may be cheaply constructed, and the same provided with detachable wearing parts adapted for convenient renewal.

A further object comprehends a construction and arrangement of the rollers whereby a relatively slow movement is effected upon the parts subject to pressure.

The invention also embodies guiding means for accurately spacing the rollers to secure absolute alinement thereof.

In describing the invention in detail reference is had to the accompanying drawings, forming part of this specification, and wherein like characters of reference are used to designate like parts throughout the several views, and in which—

Figure 1:
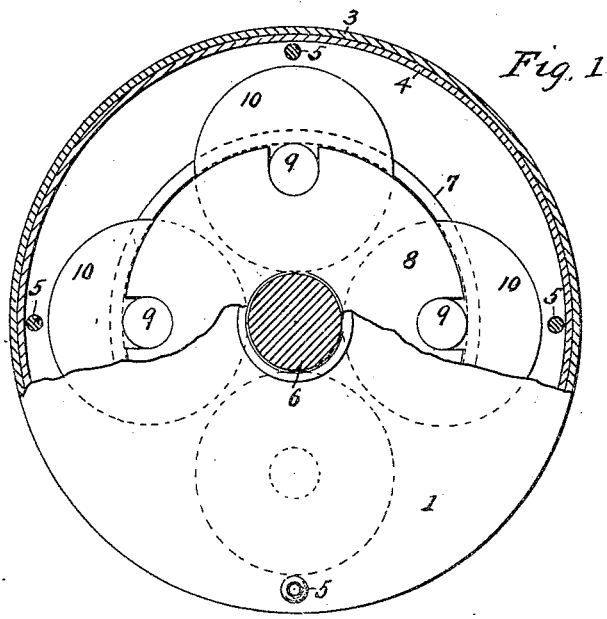
Figure 2:
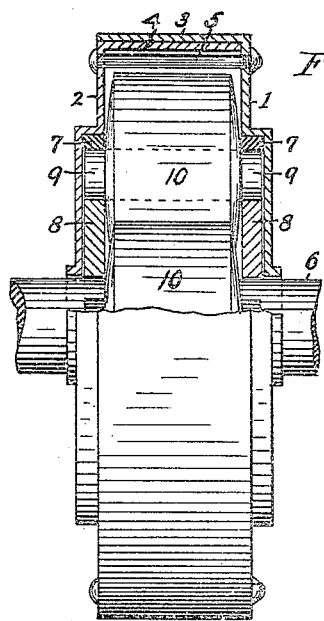
Figure 3:
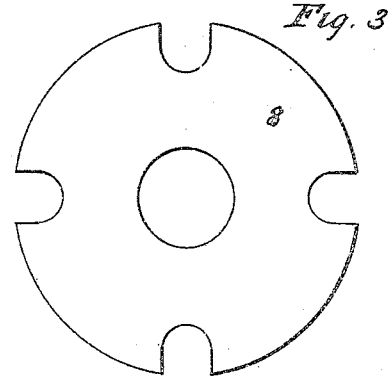

Figure 1 is a side view of the wheel embodying the present invention, a portion of the side wall of the casing being removed to show the antifriction rollers and their spacing member. Fig. 2 is a partial cross-section through the wheel; and Fig. 3 a detail side view of one of the spacing members.

Numerals 1 and 2 designate the side walls of the wheel-body or roller-casing, provided respectively with closely fitting telescopic rims 3 and 4, and detachably secured together with tie-rods 5. The side walls are preferably stamped or pressed from suitable metal and are provided with central perforations embracing the axle or shaft 6, and are also formed with side chambers having bearing-ledges to receive and firmly support the removable annular wearing-sleeves 7. Within the chambers of the side walls are loosely mounted the rotatable spacing-members 8, preferably in rotatable contact with the axle 6. Slotted guide-bearings are formed in the spacing members for receiving the reduced journal-ends 9 of the antifriction rollers 10, the latter receiving the load or pressure exerted upon the axle and transmitting it through their journal-ends to the wearing-sleeves 7, the spacing-member serving solely to guide the antifriction rollers to insure their exact alinement and consequent freedom of movement. During the rotation of the wheel-casing about the axle 6, a rolling movement is effected between the contact surfaces of the axle and the antifriction rollers and between that of the roller-journals and the annular sleeves, causing the rollers to rotate about their separate axles and also about the main axle 6, with a variation of velocity of the several rotations corresponding to the difference in their respective dimensions, and as herein illustrated producing a relatively slow movement upon the pressure surfaces and consequently increasing their durability.

What I claim as my invention and desire to secure by Letters Patent, is—

1. In a roller-bearing wheel, the combination with a fixed axle or shaft, of a two-part wheel-body or casing having inwardly-telescoping rims, chambered side walls formed with the rims and provided with central perforations embracing the shaft, bearing-ledges formed with the chambered side walls, a series of rollers coacting with the shaft and provided with reduced journal-ends engaging the bearing-ledges, centrally-perforated spacing members mounted in the chambers of the side walls and embracing the shaft, slotted guide-bearings formed in the spacing members for engagement with the journal-ends of the rollers, and means for detachably securing together the two parts of the wheel-body.

2. In a roller-bearing wheel, the combination with a fixed axle or shaft, of a two-part wheel-body or casing having inwardly-telescoping rims, chambered side walls formed with the rims and provided with central perforations embracing the shaft, bearing-ledges formed with the chambered side walls, annular wearing-sleeves removably secured to the bearing-ledges, a series of rollers coacting with the shaft and provided with reduced journal-ends engaging the wearing-sleeves, centrally-perforated spacing members mounted in the chambers of the side walls and embracing the shaft, slotted guide-bearings formed in the spacing members for engagement with the journal-ends of the rollers, and means for detachably securing together the two parts of the wheel-body.

3. A roller bearing comprising a two-part wheel-body or casing stamped or pressed from sheet-metal and formed with two side walls provided with central perforations to receive a shaft or axle and having inwardly disposed telescopic rims, said side walls being also formed with outwardly-extending chambers including bearing-ledges formed therewith, means for detachably connecting the two-part wheel-bodies, an annular wearing-sleeve detachably mounted in the chambers and bearing upon the ledges, in combination with an axle or shaft, a plurality of antifriction rollers having reduced journal-ends, and spacing members provided with guide-bearings and rotatably mounted in the chambers of the side walls.

Signed at Bayonne in the county of Hudson and State of New Jersey this 7th day of April A. D. 1908.

GRACE A. BREWER.

Witnesses:
MAY RORKE,
LOUISE R. ARMSTRONG.